United States Patent
Drees

[19]

[11] Patent Number: 5,930,503
[45] Date of Patent: Jul. 27, 1999

[54] SYSTEM AND METHOD FOR ON DEMAND REGISTRATION OF TASKS

[75] Inventor: Douglas P. Drees, Fort Collins, Colo.

[73] Assignee: Hewlett-Packard Co, Palo Alto, Calif.

[21] Appl. No.: 08/580,673

[22] Filed: Dec. 29, 1995

[51] Int. Cl.[6] .................................................. G06F 9/445
[52] U.S. Cl. ......................... 395/651; 395/715; 395/685
[58] Field of Search ................................... 395/670, 671, 395/652, 712, 685, 651

[56] References Cited

U.S. PATENT DOCUMENTS

| | | | |
|---|---|---|---|
| 5,546,577 | 8/1996 | Marlin et al. | 395/600 |
| 5,737,737 | 4/1998 | Hikida et al. | 707/104 |
| 5,758,074 | 5/1998 | Marlin et al. | 395/200.08 |

OTHER PUBLICATIONS

Schnaidt, Patricia Managing the Desktop. Lan Magazine Jul. 1994, V9 N7 p. 25(2).

Notess, Mark H. A User Interface Management System for HP–UX System Administration Applications HP Journal Jun. 1993 V44 N3 p. 80(5).

Auban et al. The Architecture of Ra: A Kernel for Clouds, Georgia Institute of Technology Technical Report p. 17–18 1988.

*Primary Examiner*—Lucien U. Toplu

[57] ABSTRACT

A registration manager implemented as a task registration manager for dynamically registering management task descriptions on demand. The task registration manager includes a static registration mechanism, a static registry, and a runtime registration mechanism. At installation of a management application, the static registration mechanism stores a relatively small amount of information regarding each task provided with that application in the static registry for use at runtime. At runtime, the runtime registration mechanism registers a task the first time a specific task is requested by consulting the information contained in the runtime registration mechanism and then parsing the task description and placing it in a description object. A pointer to the description object is returned. Subsequent executions are performed using the pointer to the description object already in memory.

16 Claims, 6 Drawing Sheets

SYSTEM AND METHOD FOR ON DEMAND REGISTRATION OF TASKS

FIELD OF THE INVENTION

The present invention generally relates to application platform registration by a computer management system, and more particularly, to a system and method using a registration manager for efficiently registering task descriptions on demand.

BACKGROUND OF THE INVENTION

A large number of application platform products are available in the computer industry that are designed to allow other applications software products to actively interoperate or integrate with them. The application platform provides a set of common services that reduce the amount of work associated with developing the applications and also provides a single interface to the user. In addition, an application platform product typically includes some number of base or built in applications that use these common services. Examples of these application platforms include database products, network management products, operating systems, group collaboration tools and system management products. Hewlett-Packard's system administration manager (SAM) is a specific example of such an application platform that provides for a number of common system management services, such as error handling, event logging, user interface control, and task management.

In this type of software product, a need exists for the ability to learn about newly installed application products so that necessary information about the new product is available in the platform for accomplishing planned interoperability or integration. Since this information is needed at runtime, i.e., while the application platform is actually in operation on a computer system, the information must be loaded into the memory of the computer system at runtime. It would be difficult and problematic to try to load this information into memory prior to the invocation of the application platform and to leave it in memory after the application platform has been exited by the user. Thus, the cost of loading this information must be borne at runtime, typically at the start up of the application platform.

The cost of loading this information at runtime can be significant both in the time it takes to load in the information and in the memory space required to hold all the information. Loading the information usually entails opening a number of files on a file system, allocating memory to store their contents, and reading them into that allocated memory.

The information that must be loaded is typically descriptive information about some portion of the operation of the associated application product. In the case of SAM, this descriptive information includes the descriptions of entries in a menu system that allows the user to select the application for execution, the descriptions of some data structures used to share information between applications, and the descriptions of some tasks that the application product can perform as part of managing a portion of a computer system. For purposes of illustrating some of the disadvantages associated with loading such information into memory at runtime, a brief discussion follows regarding the invocation and execution of system management tasks associated with system management applications as a part of SAM.

The aforementioned management tasks come in two types and three implementations. The first type of task, referred to as a query task, contacts the system or utility being managed to retrieve information about the current configuration and state of the system or utility. The second type of task, referred to as an action task, actually makes changes to the configuration or state of the system or utility.

In regard to implementation, these management tasks can be implemented as a set of commands executed by a command interpreter on the computer system, typically written in some interpreted scripting language, such as that of the POSIX shell. They can also be implemented as one or more functions found in a shared library. A third implementation is as a change performed across a number of computer systems simultaneously via some remote communication protocol.

The SAM employs a task manager facility to interpret the management task descriptions and to manage the execution of these management tasks. This task manager is able to perform management tasks implemented in any one of the three forms as a common service for all SAM based system management applications. In operation, the task manager, upon receiving a request to perform a specific management task, retrieves the description for the specified task from memory and then manages the execution of that task. Once the task is completed, the task manager facility processes the results and then performs several housekeeping duties such as logging the completion of the task and processing any error messages. Accordingly, any application product installed on the computer system that is integrated with the SAM can call for the execution of any task that has been registered whether by it or any other application. Thus, all the descriptive information for each management task is loaded into memory during a process called start up registration which occurs at the beginning of each user session. Considering that this entails reading, parsing, and loading into memory up to 900 tasks and 100 data classes at each start up, it can be appreciated that this process is time consuming and utilizes a significant amount of valuable memory. However, in a typical user session, only a few tasks, i.e., 10 or so, are executed. Thus, the system is unjustifiably hindered by the time consuming task of parsing and loading all the task descriptions which are then stored in memory, taking up valuable space.

Therefore, a heretofore unaddressed need exists in the industry for a registration system and method for registering task descriptions in an efficient manner that does not hinder performance, especially with respect to conserving memory and minimizing registration processing time. Moreover, the same statement can be made about other similar application platform products that must be able to load into memory at runtime similar descriptive information.

SUMMARY OF THE INVENTION

The present invention overcomes the Inadequacies and deficiencies of the prior art as discussed hereinbefore and as well known in the industry. The present invention can be broadly thought of as a novel application platform product registration system and method which efficiently registers product information on demand. For purposes of brevity, the present invention is disclosed herein as a registration manager that manages management task registration processes and that can be employed within a system administration manager, such as Hewlett-Packard's SAM, via a software program. The registration manager facilitates the efficient registration of the descriptions of management tasks by providing on demand registration of the tasks. Consequently, only the tasks utilized during a user session are parsed and loaded into memory. This enhances the system administration manager's performance by not having to register all the management tasks at the beginning of each user session.

The operation of the registration manager can generally be divided into static registration and runtime registration. Static registration occurs when a system management application that is being installed on the system calls for the registration of all the management tasks associated with that application. This includes reading and parsing each description file containing task descriptions found in the fileset that is provided with the application. By doing so, the tasks are checked for syntax errors and duplication of names. If either occurs, an error message is issued and the installation is aborted. During this process, certain information about each task is copied into several persistent data structures or tables referred to as a task list and a files list. These lists are stored in files and are collectively referred to as the static registry. Because a minimal amount of information is kept in the aforementioned lists, the list can be quickly loaded into memory at the beginning of each user session of SAM. This produces a dramatic savings in memory since the two lists occupy much less space in memory than would all the task descriptions. In addition, there is a dramatic savings in processing time since only the two lists are loaded as opposed to parsing and loading every task description.

Thus, at beginning of each user session, the lists comprising the static registry are loaded into memory for use by the registration manager when a task is being requested to be executed. The in-memory versions of the task list and files list are collectively referred to as the runtime registry.

Runtime registration occurs when a management application that is operating requests for the first time in a user session that a particular management task be performed. In runtime registration, the information contained in the files list and the task list are utilized to locate the particular file containing the requested task description. Once located, a parser is invoked and a detailed description of the task is loaded into memory for use by the task manager facility for the remainder of the user session. Thus, any subsequent request for that task can be performed using the task description already in memory.

In accordance with a feature of the present invention, it allows other management applications to take advantage of management task descriptions previously registered and existing in memory rather than having to include those tasks descriptions in their associated fileset for installation.

Other features and advantages of the present invention will become apparent to one with skill in the art upon examination of the following drawings and detailed description. It is intended that all such additional features and advantages be included herein within the scope of the present invention, as is defined by the claims.

BRIEF DESCRIPTION OF THE DRAWINGS

The present invention can be better understood with reference to the following drawings. The elements of the drawings are not necessarily to scale, emphasis instead being placed upon clearly illustrating principles of the present invention. Furthermore, like reference numerals designate corresponding parts throughout the several views.

DETAILED DESCRIPTION OF THE PREFERRED EMBODIMENT

The following description is of the best presently contemplated mode of carrying out the present invention in the context of task registration manager for registering the descriptions of system management task associated with system management applications that integrate with a system administration manger, such as SAM. However, as can be appreciated by one of ordinary skill in the art, the present invention is equally applicable in other application platforms, such as database products, network management products, operating systems, or group collaboration tools, for registering product information on demand. Thus, the present description is not to be taken in a limiting sense but is made merely for the purpose of describing the general principles of the invention. The scope of the invention should be determined by referencing the appended claims.

I. Architecture

A task registration system in accordance with the present invention can be stored on any computer-readable medium for use by or in connection with a computable-related system or method. In the context of this document, a computer-readable medium is any electronic, magnetic, optical, or other physical device or means that can contain or store a computer program for use by or in connection with a computer-related system or method.

Figure 1:
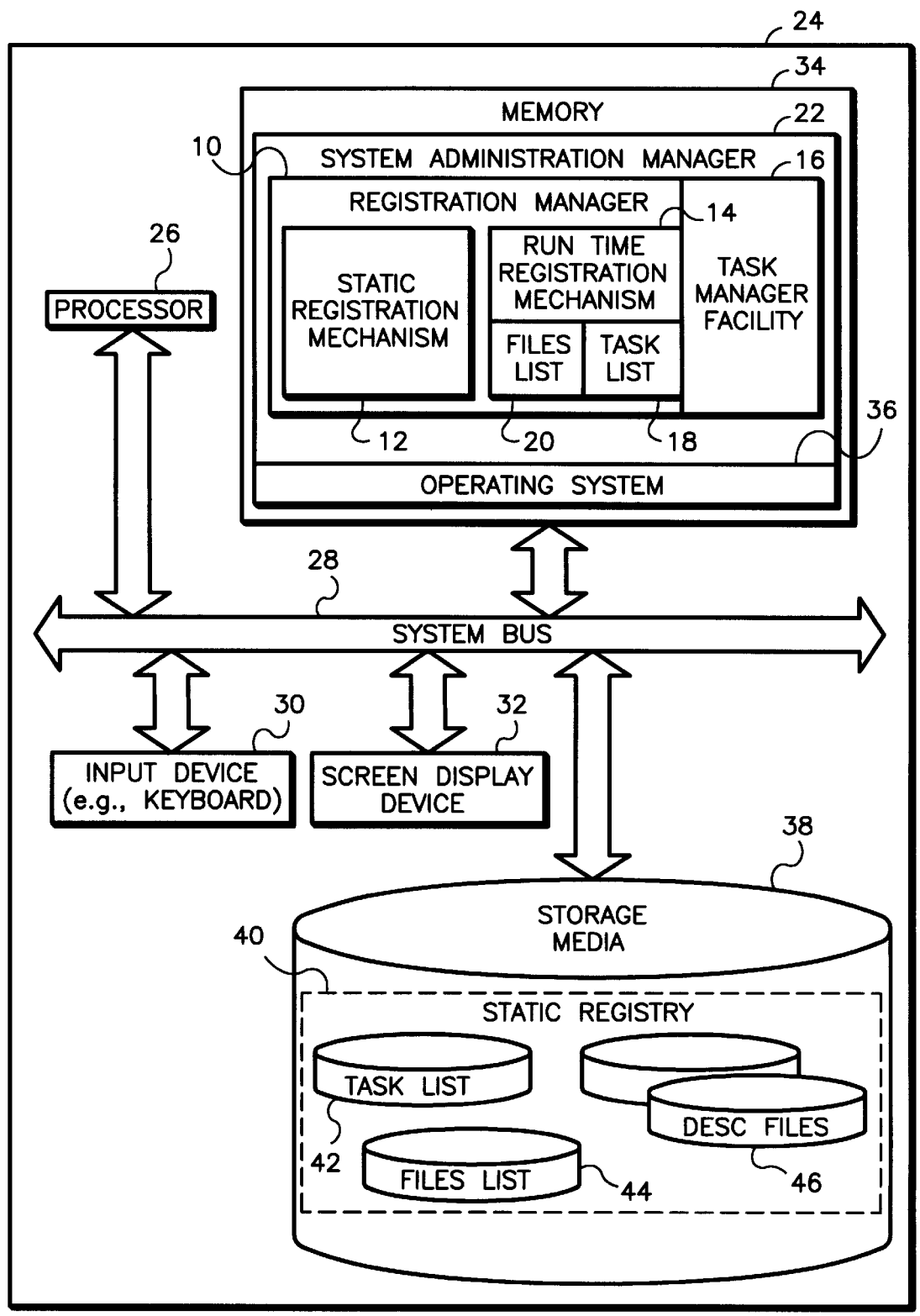
FIG. 1 is a block diagram illustrating the present invention situated within a computer-readable medium in the context of a computer system.

As illustrated in FIG. 1, the registration system of the present invention is implemented as a task registration manager 10 which is comprised of a static registration mechanism 12 and a runtime registration mechanism 14. The runtime registration mechanism 14 operates in connection with the task manager facility 16. The runtime registration mechanism 14 includes a runtime task list 18 and a runtime files list 20, collectively referred to as the runtime registry. The static task registration mechanism 12 operates in conjunction with the application installation and removal processes. The task manager facility 16 is configured as supporting facilities in a system administration manager (SAM) 22. The SAM 22 operates within a computer system 24 and is specifically configured by task registration manager 10 for the purpose of dynamically registering system management tasks in order to conserve memory and to reduce the amount of processing time spent registering tasks in a single user session.

The computer system 24 comprises a conventional processor 26 that communicates to other elements within the computer system 24 via a bus network 28. An input device 30, for example, a keyboard or mouse, is used to input data from a user of the computer system 22, and a screen display device 32 is used to output data to the user. A memory 34 within the computer system 24 stores the SAM 22 as executable instructions, i.e., a computer-readable program that cause computer system 24 to function in a particular fashion as discussed in detail below. The task registration manager 10 is preferably implemented as integral parts of SAM 22. Further, SAM 22 communicates with a conventional operating system 36 for running and managing applications on the computer system 24, and which is also stored in memory 34. A persistent storage medium 38 within the computer system 24 stores application files installed on the computer system 24. Also stored in the storage medium 38 is a static task registry 40 which contains a static task list 42, a static files list 44, and some number of task description files 46 which have been registered with the static registry 40.

The static registration mechanism 12 is provided to perform task registration of the management tasks provided with each new system management application added to the computer system 24. This initial registration process occurs during the installation of the new application and is referred to as static registration. When the fileset containing the application is installed onto the computer system 24, a configuration script provided with the fileset invokes the static registration mechanism 12, passing to it the name(s) of file(s) 46 containing task descriptions. The static registration mechanism 12 parses each such file 46, gathering global information that applies equally to all the task descriptions in file 46, and checking each task description in file 46 for syntax errors and for duplication of task names in order to avoid errors during the execution of the application. The static registration mechanism 12 places this global file information and the full file pathname for the file 46 into an entry in the static files list 44 of static registry 40. Each file 46 entry in the static files list 44 is given a unique file index number. Further, the static registration mechanism 12 gathers certain information regarding each task being registered and stores that information in the static task list 42 of the static registry 40 for future reference when the task is requested to be executed by the SAM 22 at runtime. Specifically, the information gathered by the static registration mechanism 12 includes the name or identifier of the task (which is later used to identify the task in requests to the task manager facility 16), the index number for the file 46 containing the task description, and the byte offset into file 46 at which the task description begins.

The runtime registration mechanism 14 is provided to perform on demand task registration upon request by a management application while the application is running. Accordingly, as part of the start-up process for a management application using task manager facility 16, the runtime registration mechanism 14 is initialized by reading in the contents of the static task list 42 of the static registry 40 into the runtime task list 18 and reading in the contents of the static files list 44 of the static registry 40 into the runtime files list 20. Then, the first time a specific management task is requested to be executed by the task manager facility 16, the task is registered by consulting the information about that task stored in the runtime registry of the runtime registration mechanism 14 during the start-up, and then loading and parsing the specific task description into memory prior to execution. Because runtime registration requires the results of static registration, the static registration mechanism 12 needs to register the task before runtime registration mechanism 42 is called. However, this is guaranteed because the static registration mechanism 12 is automatically invoked as part of the process of installing the management application and must succeed before the management application is available to be executed by the user. Subsequent executions of that task are performed using the task description already in memory. This eliminates the need for the costly start-up process at the beginning of each user session where all the tasks are parsed and loaded into memory. Further, this allows only the tasks that are actually executed to occupy the precious memory resources available in the computer system 24.

Figure 2:
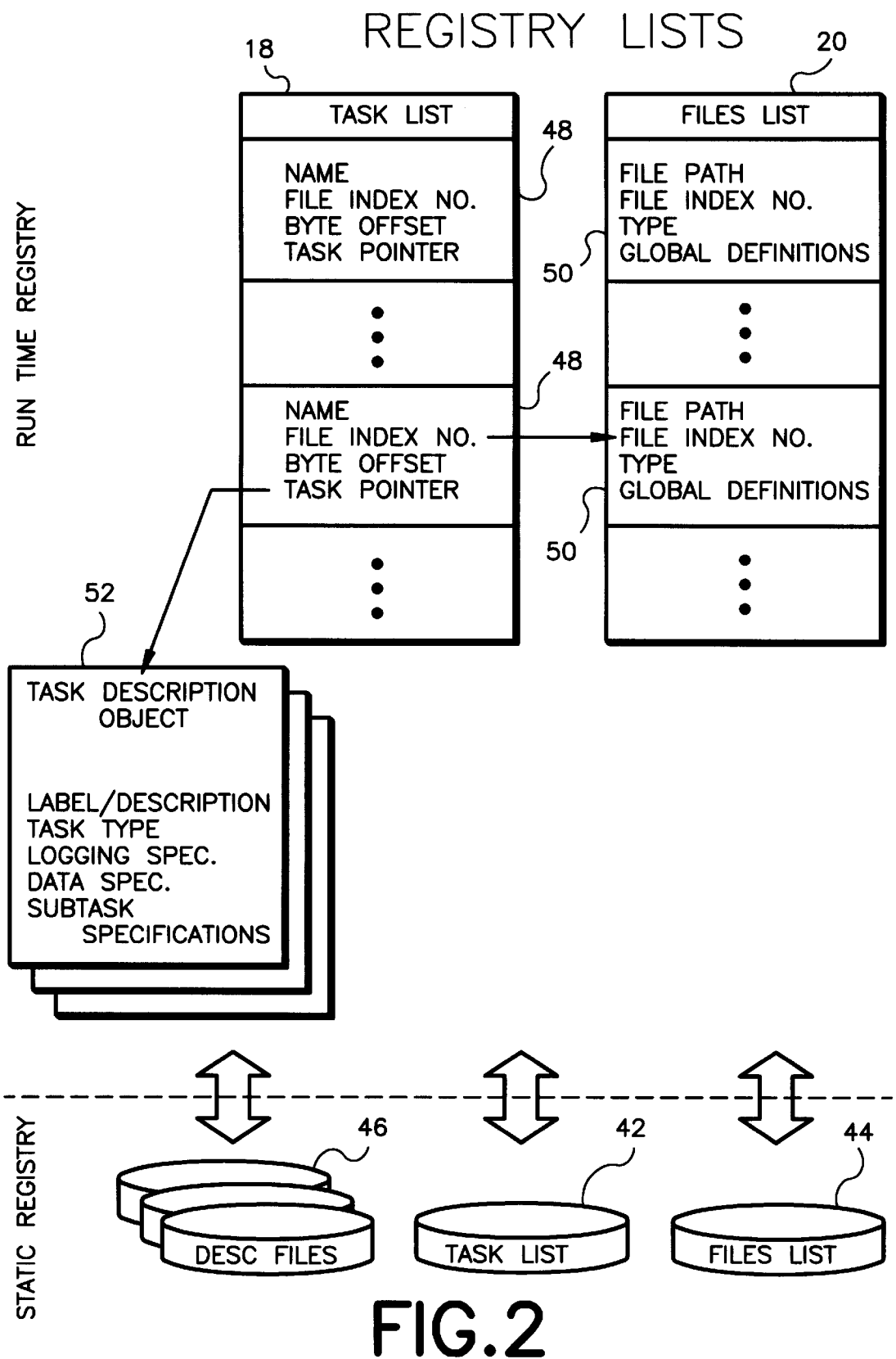
FIG. 2 is a block diagram of the static and runtime registries of FIG. 1.

In accordance with an important feature of the present invention, the static registry 40 and the runtime registration mechanism 14 each include three data structures or tables which contain specific information about each task as gathered by the static registration mechanism 12 during static registration. As illustrated in FIG. 2, the files that make up the static registry 40 include a static task list 42 file, a static files list 44 file, and a set of task description files 46. Also, the data structures of the runtime registration mechanism 14 include a task list 18, a files list 20, and a set of task description objects 52, collectively referred to as the runtime registry.

In both registries, the task lists 18, 42 are populated with a plurality of elements 48, one element for each management task included in each of the system management applications installed on computer system 24. Task lists 18, 42 are configured as a look-up table according to task name. Each element 48 is configured to contain a minimum amount of information needed for the unique identification of the task associated with that element. For instance, an element 48 may contain the task name, a file index number associated with file 46, and a byte offset denoting the position of the task in file 46 containing the description of that task. The task lists elements 48 are identical in both registries except that the elements 48 of the runtime task list 18 include an additional data element that is a pointer to a task description object 48. When the runtime task list 18 is initialized at start up with the contents of the static task list 42, this task description object pointer is set to null. The functionality of each these entries within an element 48 will become more apparent upon review of the operation of the present invention as provided below.

The files lists 20, 44 of both registries are populated with a plurality of elements 50, one element for each task description file 46 installed on the computer system 24. Each element 50 of files list 20, 44 includes additional information which is global to each task described in the associated file 46. Further, the elements 50 of files lists 20, 44 are numerically indexed according to a file index number assigned to each element 50 upon static registration. This same file index number is included in the associated element 48 of task lists 18, 42. The information included in each element 50 includes a path (which defines the location of the file in computer system 24), type of file, and global definitions. The global definitions provide information necessary for the execution of a management task that applies equally to all the tasks described in description file 46, and include, for example, shared libraries paths, revision statements, and local language message catalog statements.

The file type is included so that the registration facility of the present invention can be used to register other description items in addition to system management tasks. For example, the registration system of the present invention may support the registration of both tasks and data object classes. In this case, the class description files would be differentiated from task description files in the files lists by the file type and by providing an addition class list in both the runtime registry and the static registry. The class list would be configured identically to the task lists herein described.

Figure 3:
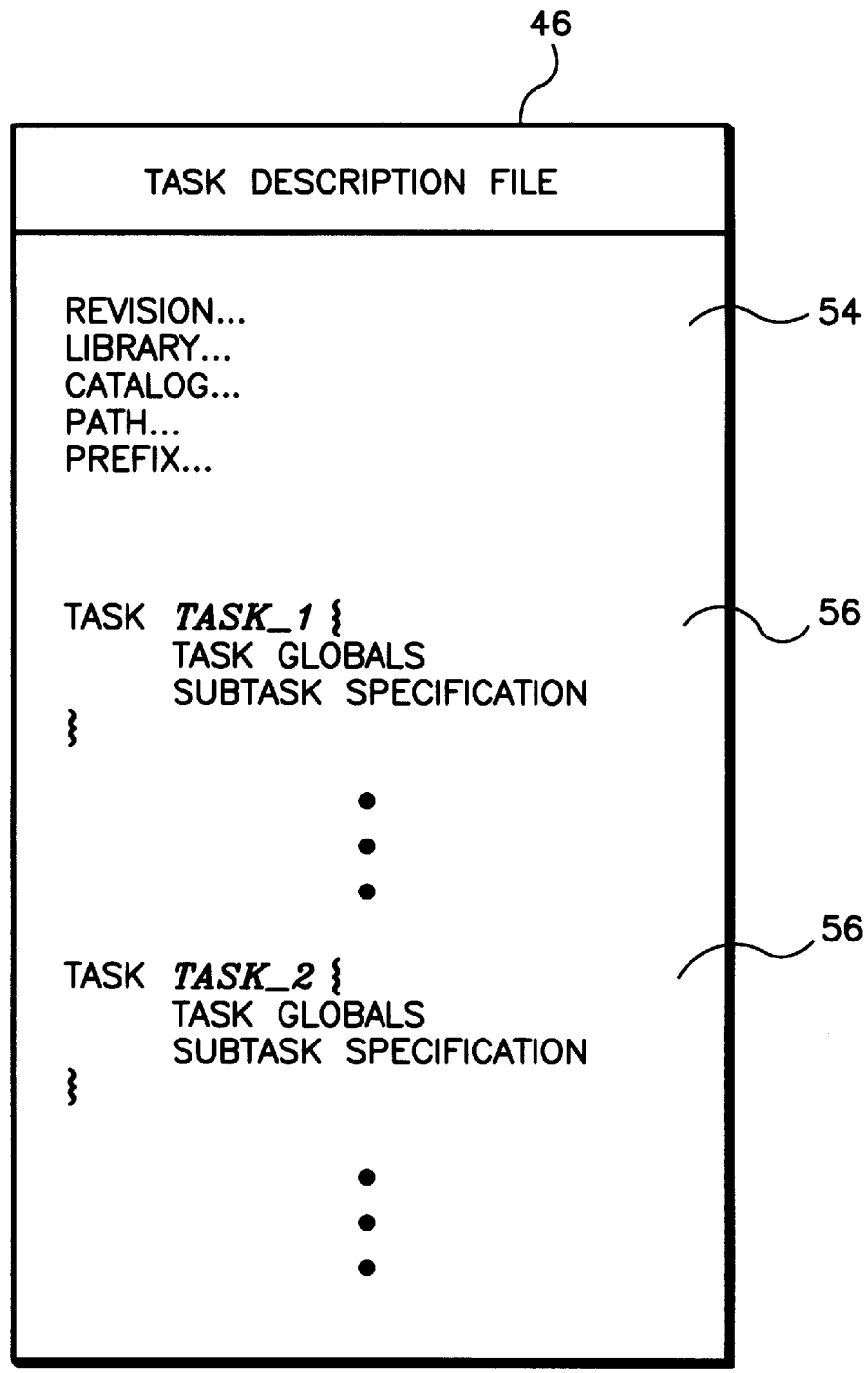
FIG. 3 is a block diagram of the task description files of FIG. 2.

As illustrated in FIG. 3, the task description files 46 used by task registration manager 10 are relatively simple in structure. The files are preferably text files composed in a human readable task description language. At the beginning of the file are one or more global definition statements 54 which apply to each task described in the file. The task manager facility 16 defines the following description file global definition statements: a revision statement which specifies a revision code for all tasks in the file; a library statement, zero or more of which can be included, which specifies the path to a shared library to be loaded when any task defined in the file is to be performed; a catalog statement which specifies the path to a local language message catalog and optionally a message set number used to look up text messages to be displayed to the user; a path statement which applies to only a specific type of task and specifies a sequence of directory paths to search for executable commands; and a prefix statement (the only required global definition statement) which specifies a unique character string identifier for the management application to which these task belong.

In addition, the task description files 46 contain one or more task descriptions 56. These descriptions are a collection of statements enclosed in braces and preceded by the keyword "task" and a unique task identifier or name. The specific statements used to describe a task are not important within the scope of this disclosure, but for example, they include some statements that apply to all task types and some additional statements that are specific to one or more task types. There is no set limit to the number of tasks that can be described in a description file other than the file size limit imposed by the operating system.

Hence, both the static registration mechanism 12 and runtime registration mechanism 14 can be thought of as memory circuits having a structure defined by a computer program. A flowchart of a computer program for implementing the static registration mechanism 12 is provided in FIGS. 4A–4B, and similarly, a flowchart of a computer program for implementing the runtime registration mechanism 14 is provided in FIG. 5.

II. Operation

The preferred operation and sequence of events corresponding with the task registration manager of the present invention and the associated methodology are described hereafter.

When a management application is installed on a computer system 24, the configuration script within the application's fileset calls the static registration mechanism 12 and provides it with a path to the task description file of the fileset where each management task description associated with the new application is located. This file containing the task descriptions is placed in a persistent storage medium by the application at installation and its path is given to the static registration mechanism 12 for static registration purposes.

Figure 4A:
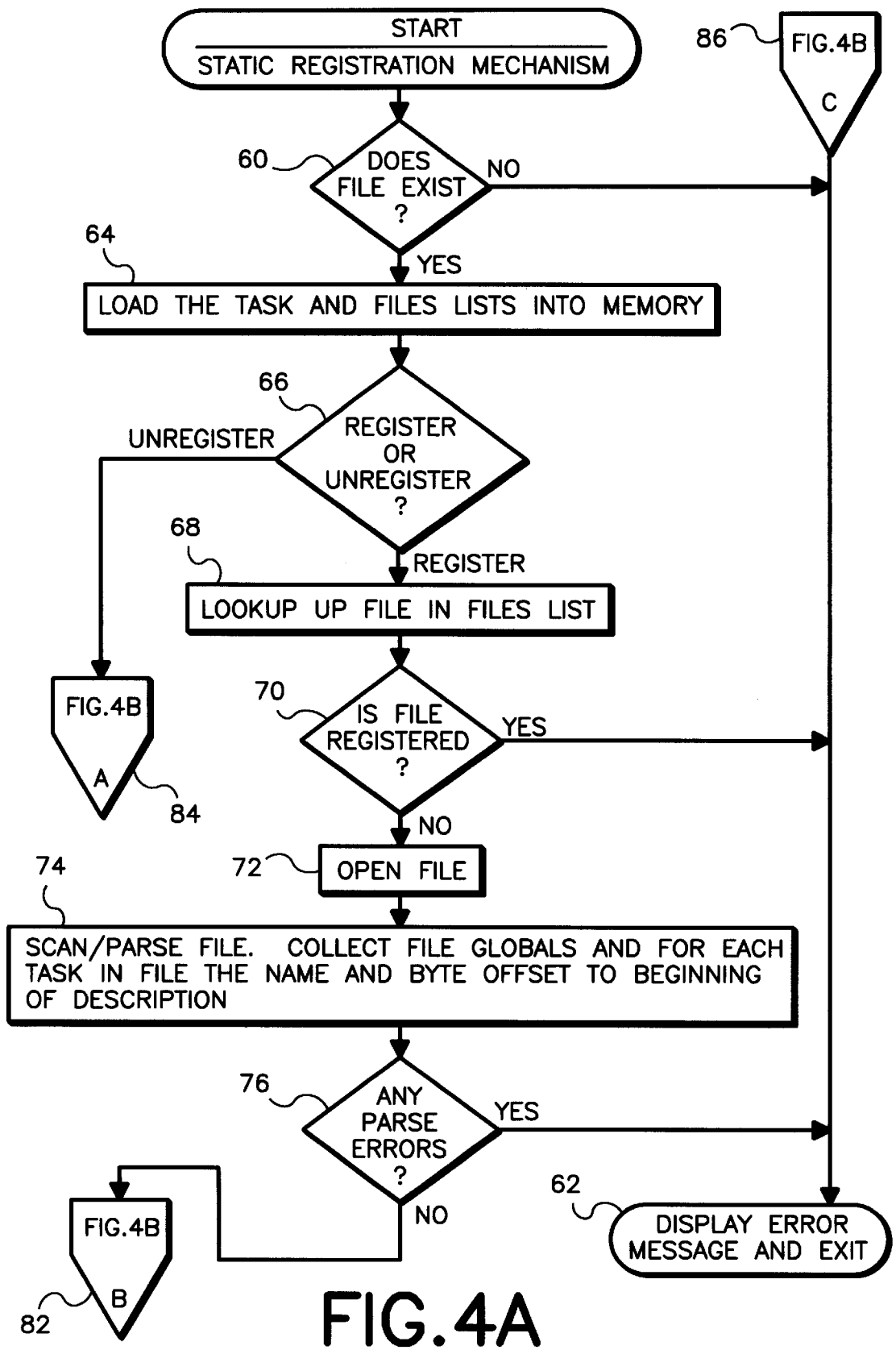
FIGS. 4A–4B are flowcharts of the implementation of the static registration manager of FIG. 1.

Referring to FIG. 4A, after invocation of static registration mechanism 12, block 60 determines if the file at the provided path exits. If the file does not exit, then block 60 transfers to block 62 which displays an error message via interface 28 (FIG. 1) and aborts the static registration process. If the file exists, then block 60 transfers to block 64 which loads task list 42 and files list 44 of the static registry 40 into the runtime registration mechanism 14 in memory. Next, block 66 determines whether the tasks in the specified task description file are to be registered (i.e., added to the registry) or unregistered (i.e., removed from the registry). In the same sense that description files are added to the static registry 40 when the applications of which they are a part are installed onto the computer system 24, these same descriptions files can be removed from the static registry 40 in the event that the corresponding applications are removed from the computer system 24. The unregister process is discussed with reference to FIG. 4B hereafter. If the task is to be registered, block 66 transfers to block 68 which looks up the task.

At block 68 the runtime task list 1a is checked to determine if the specified task description file has already been registered. If it is determined by block 70 that the file has already been registered, that is, the tasks contained in the file have been previously registered which is an error condition, then block 70 transfers to block 62 where an error message is displayed and the process is aborted. If the task description file has not been registered, then block 70 transfers to block 72, which opens the task description file. Block 74 then scans and parses the task description file, starting at the beginning of the file and continuing to the end of the file, parsing the global definitions as well as each task in the file. The file global information is collected, and for each task found in the file, the task name and location of the first character of the task description with the file (referred to as the byte offset) are also collected. If any syntax errors are found during the parsing of the file, the block 76 transfers to block 62 which displays an error message and aborts the process.

At block 78, element 50 is created in files list 20 for receiving the file path, file index number, and global definitions of the specified description file. The file index number for the specified description file is assigned as part of adding element 50 to files list 20. The elements 50 in files list 20 are sequentially numbered so that each element is assigned a file index number corresponding to its position in files list 20. Then block 80 sequences through the task description information collected in block 74, task by task, checking to see if the task name is a duplicate of a task already found in task list 18, and if not, creating an element 48 in task list 18 for receiving the task name, the file index number determined in block 78, and the byte offset for the task.

Figure 4B:
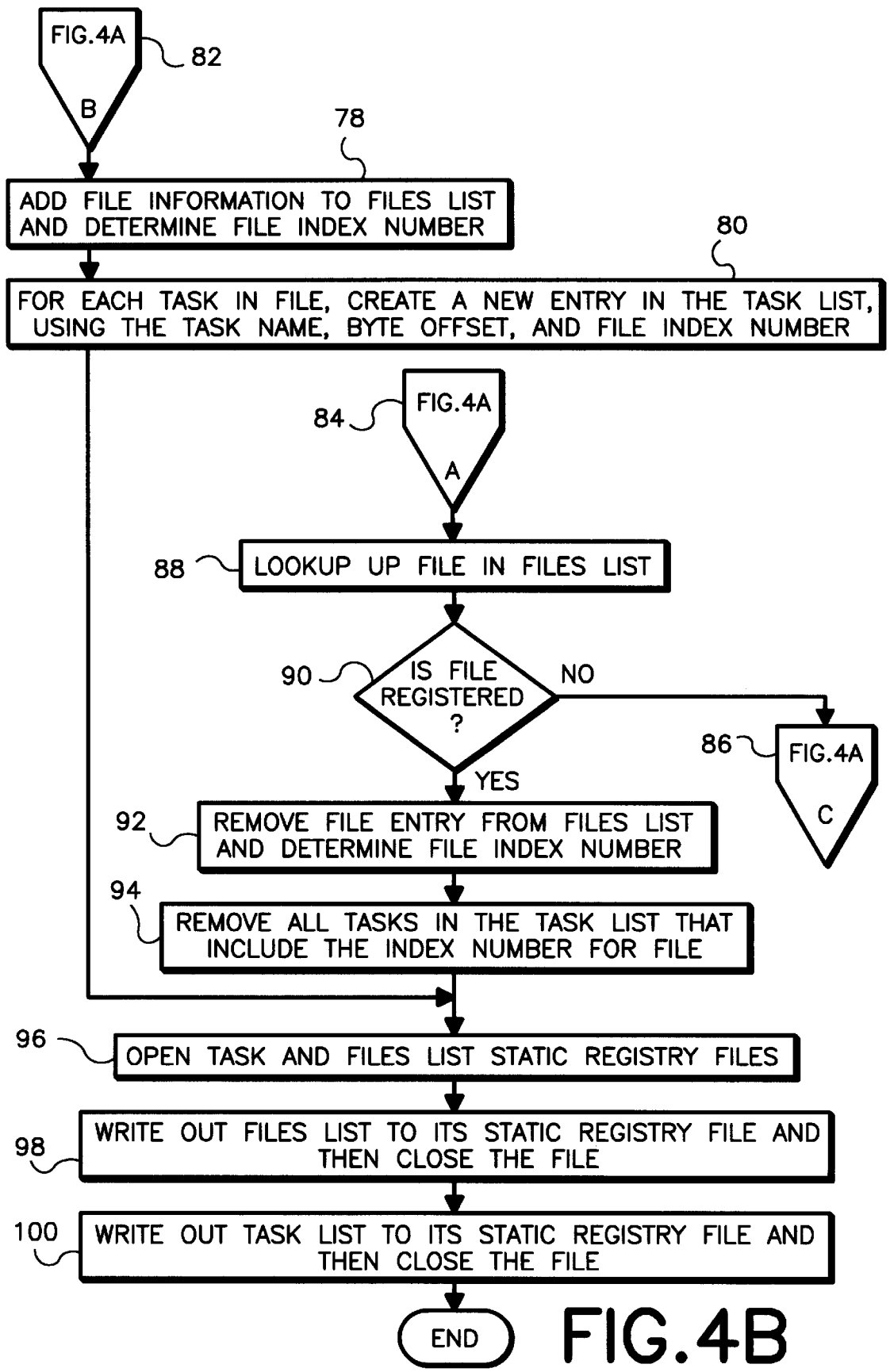

Referring now to FIG. 4B, block 82 (FIG. 4A) transfers to block 96 which opens the static task list 42 and static files list 44 in static registry 40 for the purpose of updating the static lists structure. Next, block 98 writes out the updated files list 20 to the corresponding static files list 44 and then closes the static files list 44. Block 100 then writes out the updated task list 18 to the corresponding static task list 42 and then closes the static task list 42. This completes the static registration process.

Accordingly, static registration mechanism 12 essentially stores in static registry 40 a minimum amount of information regarding each task on computer system 24 so that the information is readily accessible by the task registration manager 10 for retrieving the task description on demand.

Referring back to FIG. 4A, if block 66 determines the task description file is to be unregistered, block 66 transfers to block 84 and then to block 88 of FIG. 4B. Block 88 looks up the specified description file in the files list 20 and then transfers to block 90. If block 90 determines the file is not registered, block 90 then transfers to block 86 and then to block 62 of FIG. 4A which displays an error message and aborts the process. If the file is registered, block 90 transfers to block 92 which removes the element 50 in files list 20 associated with that specific file and determines the file index number of the file in so doing. Block 94 then sequences through all the elements 48 in the tasks list 18, removing all the elements 48 that reference the file index number determined in block 92. The process then transfers to block 96 where the steps of blocks 96 through 100 are applied in the manner described above.

At the beginning of each user session of the SAM 22, the lists 42, 44 of the static registry 40 are loaded into memory as a part of the start-up process. Because the static registry 40 is relatively small, this takes very little time and the resulting runtime registry occupies very little space in memory.

When, during a user session, a management application running as a part of SAM 22 on computer system 24 request a task be performed, the task manager facility 16 gathers descriptive information necessary to perform the task.

Figure 5:
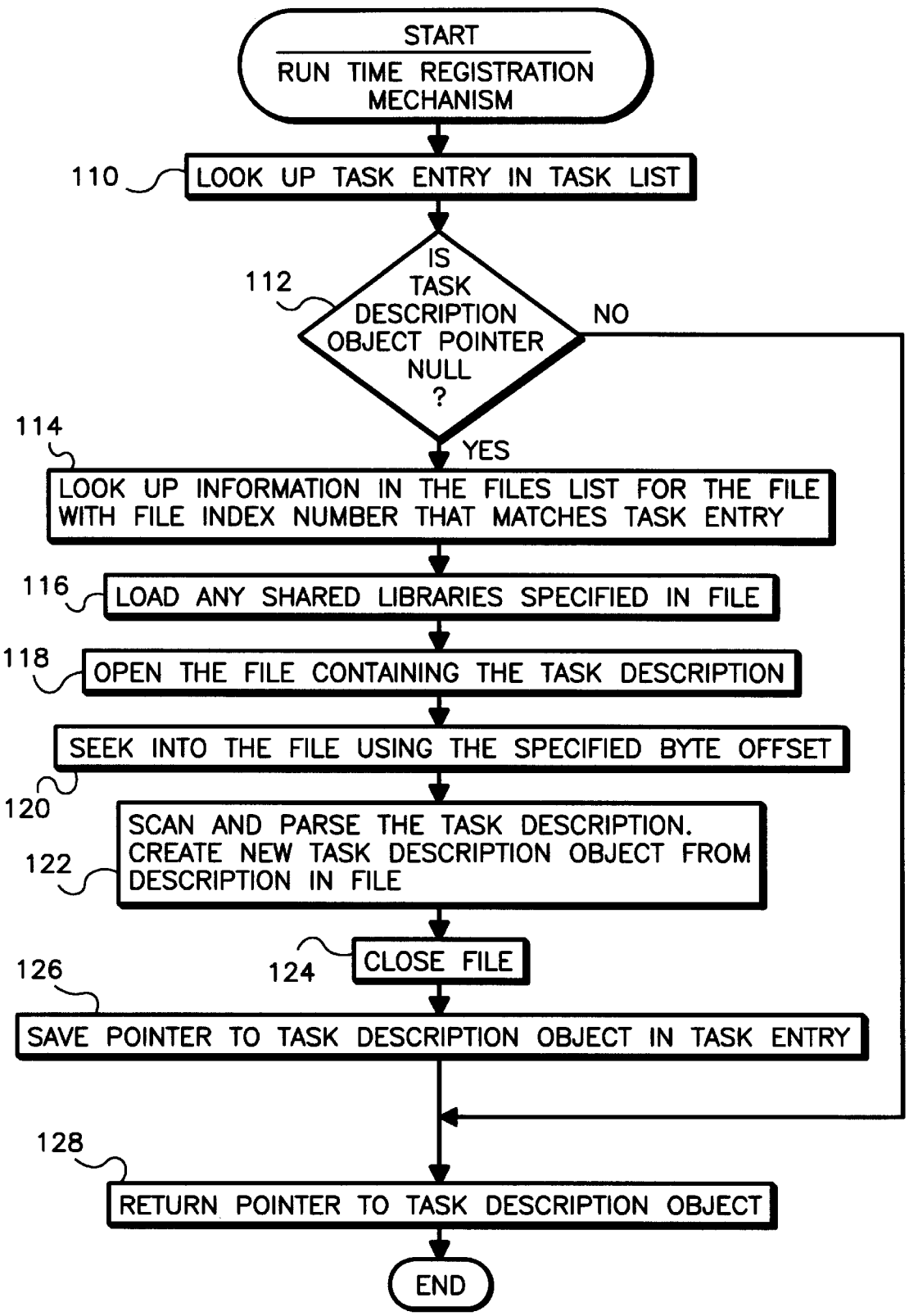
FIG. 5 is a flowchart of the implementation of the runtime registration manager of FIG. 1.

Specifically, task manager facility 16 requires the information provided at installation and stored in static registry 40. This information is gathered on demand by the runtime registration mechanism 14 and then passed back to the task manager facility 16 for execution of the task. FIG. 5 shows a flowchart indicating the functionality of the preferred embodiment for the runtime registration mechanism 14.

With reference now to FIG. 5, once the task manager facility 16 receives a request from the application to perform a particular management task, block 110 looks up the element 48 in the runtime task list 18 corresponding to the specified task.

By examining the task description object pointer in element 48, block 112 determines whether that task has been previously performed during the user session. If the task description object pointer is not a null pointer, block 112 transfers to block 128 which returns the pointer to the location in memory where the task description object (i.e., the task description) is located to the task manager facility 16. If the task description object pointer is a null pointer, then block 112 transfers to block 114 which looks up the element 50 in the runtime files list 20 with the file index number from the element 48 that was found in block 110. The information in files list 20 provides block 116 with global information such as any shared libraries that are to be loaded for the execution of the task. The global definitions contained in files list 20 can be overridden by specific statements made within the task information within the file. Further, a path is provided to the location where the file containing the task description is stored.

Block 118 then opens the description file containing the description of the specified task and block 120 seeks into the file to the beginning of the specific task description using the byte offset from the task list 18. In essence, the byte offset is used to move a file position pointer forward in the file the number of bytes specified by the byte offset provided by the static registration mechanism 12 and stored in static task list 42 at static registration. Block 122 then scans and parses the task description. By invoking the parser on the task, block 122 builds a task description object for that task. Once the parsing is completed, block 124 closes the description file and block 126 updates the task description object pointer in element 48 in task list 18, found in block 110, to point to the newly created task description object. Lastly, block 128 returns the same pointer to the task manager facility 16 so that the task can be performed.

Including the detailed description, it should be noted that it will be obvious to those skilled in the art that many variations and modifications may be made to the preferred embodiment without substantially departing from the principles of the present invention. All such variations and modifications are intended to be included herein within the scope of the present invention, as set forth in the following claims. Further, in the claims hereafter, the corresponding structures, materials, acts, and equivalents of all means or step plus function elements are intended to include any structures, material, or acts for performing the function in combination with other claimed elements as specifically claimed.

Wherefore, the following is claimed:

1. A task registration manager for registering system management task descriptions so that task descriptions are loaded into memory on demand by a task registration manager, said method comprising the steps of:

updating a files list and a task list with task description information for tasks in a task description file in a fileset provided with an application during installation of said application;

loading contents of said files list and said task list into said memory upon start up of said application;

upon receiving a request from a task manager facility to retrieve a task description of one of said tasks, determining if said task description is in said memory by referencing said task list; and if said task description is not found in said memory, loading said task description into said memory utilizing said information in said files list and in said task list, and then updating said task list to reference said task description.

2. The method of claim 1, further including the step of checking for syntax errors in said task description.

3. The method of claim 1, wherein said task description information in said task list includes a filename, a file index number, and a file byte offset, and wherein said task description information in said files list includes a path, said file index number, and global information.

4. The method of claim 1, wherein the step of updating said task list once said task description has been loaded into said memory for a first time includes updating a pointer to said task description in said memory.

5. The method of claim 1, further including the step of checking for duplication of task names when performing said updating steps.

6. The method of claim 1, wherein said files list and task list are loaded into memory from a persistent storage medium.

7. The method of claim 1, further including the step of loading any shared libraries specified in said task description file.

8. The method of claim 1, further including the step of invoking a parser on said task description file beginning at said byte offset in said file.

9. The method of claim 8, wherein the step of invoking said parser includes reading statements from said task description file and creating an object in memory containing said task description.

10. A task registration system for a task manager facility of a system administration manager of a computer system for efficient registration of system management tasks, comprising:

a static registration mechanism invoked when installing an application and configured to save a task name, a file index number and a byte offset for each task in a static task list, and to save a path, said file index number and global definitions for each task description file in a static files list; and a runtime registration mechanism initialized by loading said static task list and said static files list into a memory when said system administration manager is initially invoked in a user session, said runtime registration mechanism invoked when a task is requested to be performed by said task manager facility, and configured to load a task description of said task into said memory when said task is being requested for a first time so that only requested tasks are loaded into said memory.

11. The system of claim 10, wherein said static registration mechanism invokes a parser on said task description file in order to check for syntax errors and to determine said task name, said file index number and said byte offset for updating said static task list, and to determine said path, said file index number and said global definitions for updating said static files list.

12. The system of claim 10, wherein said runtime registration mechanism invokes a parser on said task description.

13. The system of claim 10, wherein said runtime registration mechanism creates said task description object as part of an operation of said parser and subsequently updates said runtime task list.

14. The system of claim 10, wherein said static task list and said static files list are loaded into said memory from a persistent storage medium associated with said computer system.

15. The system of claim 10, wherein said static registration mechanism and said runtime registration mechanism are disposed in said memory.

16. The system of claim 10, further comprising:

a processor;

an input device;

a display;

a memory;

a persistent storage medium; and an interface for connecting said processor with said input device, said display, said memory, and said storage medium;

wherein said static registry and said description files are disposed within said storage medium, and wherein said static registration mechanism and said runtime registration mechanism are disposed with said memory.

* * * * *